(12) United States Patent
Bayerl et al.

(10) Patent No.: US 6,938,112 B1
(45) Date of Patent: Aug. 30, 2005

(54) USE OF BUS HOLD TO PREVENT BUS CONTENTION BETWEEN HIGH SPEED PROCESSOR AND SLOW PERIPHERAL

(75) Inventors: Thomas R. Bayerl, Williamston, MI (US); Christopher M. Tumas, Brooklyn, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 563 days.

(21) Appl. No.: 09/745,919

(22) Filed: Dec. 21, 2000

(51) Int. Cl.[7] ............ G06F 13/00; H04L 5/16
(52) U.S. Cl. ................ 710/107; 375/219
(58) Field of Search .............. 710/29, 36, 107, 710/305; 370/462; 375/219; 711/147

(56) References Cited

U.S. PATENT DOCUMENTS

| 5,592,509 A | * | 1/1997 | McClear et al. ............. 375/219 |
| 5,634,034 A | * | 5/1997 | Foster ........................ 711/147 |
| 5,768,550 A | * | 6/1998 | Dean et al. ................. 710/305 |
| 5,881,142 A | | 3/1999 | Frankel et al. |
| 5,963,620 A | | 10/1999 | Frankel et al. |
| 6,075,784 A | | 6/2000 | Frankel et al. |
| 6,141,339 A | | 10/2000 | Kaplan et al. |

OTHER PUBLICATIONS

U.S. Appl. No. 09/197,044, filed Nov. 20, 1998, Way et al.
U.S. Appl. No. 09/226,575, filed Jan. 7, 1999, Rush et al.
U.S. Appl. No. 09/650,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich et al.
U.S. Appl. No. 09/727,201, filed Nov. 30, 2000, Mahaney et al.
Stanley Hronik, *Designing With Bus Hold*, 1996, pp. 59-60, Integrated Device Technology, Inc.
Author unknown, *SN74LVCH245 Octal Bus Transceiver With 3-State Outputs*, Jul. 1995, pp. 1-6, Texas Instruments.
Author unknown, *LVC Characterization Information*, Dec., 1996, pp. 14-15, Texas Instruments.

* cited by examiner

*Primary Examiner*—Khanh Dang

(57) ABSTRACT

The present invention discloses a method and apparatus for preventing contention on a common data bus between a CPU and a peripheral device with which the CPU exchanges data. A transceiver with bus hold is used to connect the bus connections of the CPU and peripheral. Control logic receives a CPU data strobe signal and generates control signals for the transceiver and the peripheral. After these control signals go inactive, the peripheral outputs transition to the high impedance state and the bus hold circuits maintain the last peripheral output data valid for reading by the CPU at the end of its read cycle. As soon as the CPU goes to a write cycle and drives the data bus, the bus hold circuits automatically switch to follow the new data.

12 Claims, 1 Drawing Sheet

USE OF BUS HOLD TO PREVENT BUS CONTENTION BETWEEN HIGH SPEED PROCESSOR AND SLOW PERIPHERAL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method and apparatus for managing read and write cycles of a central processing unit and a peripheral device which exchange data on a common bus to prevent contention.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as Ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit which controls these functions. It must exchange data with numerous peripheral devices within and external to the ISH itself. A data bus is typically used to transfer data. Address and control buses are also provided for controlling the various peripheral devices. The CPU controls data transfer by generating commands or signals indicating when it is ready to read or write data. For example, when the CPU needs to read data from a peripheral, it drives a chip select signal for the selected peripheral and a read command on a control bus and provides the address of a selected memory location on an address bus. In response to these commands, the selected peripheral writes, or drives, the addressed data on the data bus. At the end of the CPU read command, the CPU reads and stores the data which was supplied by the peripheral.

In similar fashion, the CPU sends data to peripheral devices during its write cycles. The CPU sends a chip select and write command on the control bus and provides the address of the desired memory location on the address bus. At the same time, the CPU drives data on the data bus. The selected peripheral responds by reading and storing the data at the end of the write command.

Since a common data bus is used, it is important to control read and write timing so that no two devices try to write or drive a signal onto the bus at the same time. This condition is known as contention. If contention occurs, the data on the bus is meaningless. Contention may result in physical damage to the circuitry. Even if damage does not occur, contention causes high currents and generates more heat.

Advances in processor designs have aggravated the contention problem. The speed of microprocessors has been increased dramatically. With current devices, a processor can begin writing data to a bus within 20 nanoseconds after it has completed a read operation. However, many peripheral devices are much slower. Many take up to 50 nanoseconds after the end of a read operation to enable the high impedance state and stop driving the data bus. When a read operation is followed by a write operation there can be a contention period of up to 30 nanoseconds in which the peripheral is still driving the data bus after the processor has started driving the bus.

BRIEF SUMMARY OF THE INVENTION

In the present invention, a transceiver with bus hold is used in the data bus between the CPU and a peripheral device. A data strobe signal which ends at a preselected time before the end of the CPU read cycle is generated. The data strobe signal is coupled to a peripheral control input and to the output enable input of the transceiver. The peripheral output goes three state, or high impedance, before the CPU could begin writing data to the bus. The bus hold function maintains the data written by the peripheral on the bus valid until the CPU or another peripheral begins driving the bus.

Apparatus according to the present invention includes a transceiver placed in a data bus between a CPU and a peripheral device. A control logic unit includes logic to receive CPU commands and to generate data strobe and output enable control signals for the peripheral device and the transceiver. The data strobe and output enable control signals end at a preselected time before the end of the CPU read cycle. The control logic can be implemented as a separate logic device or as software in the CPU.

DETAILED DESCRIPTION OF THE INVENTION

Figure 1:
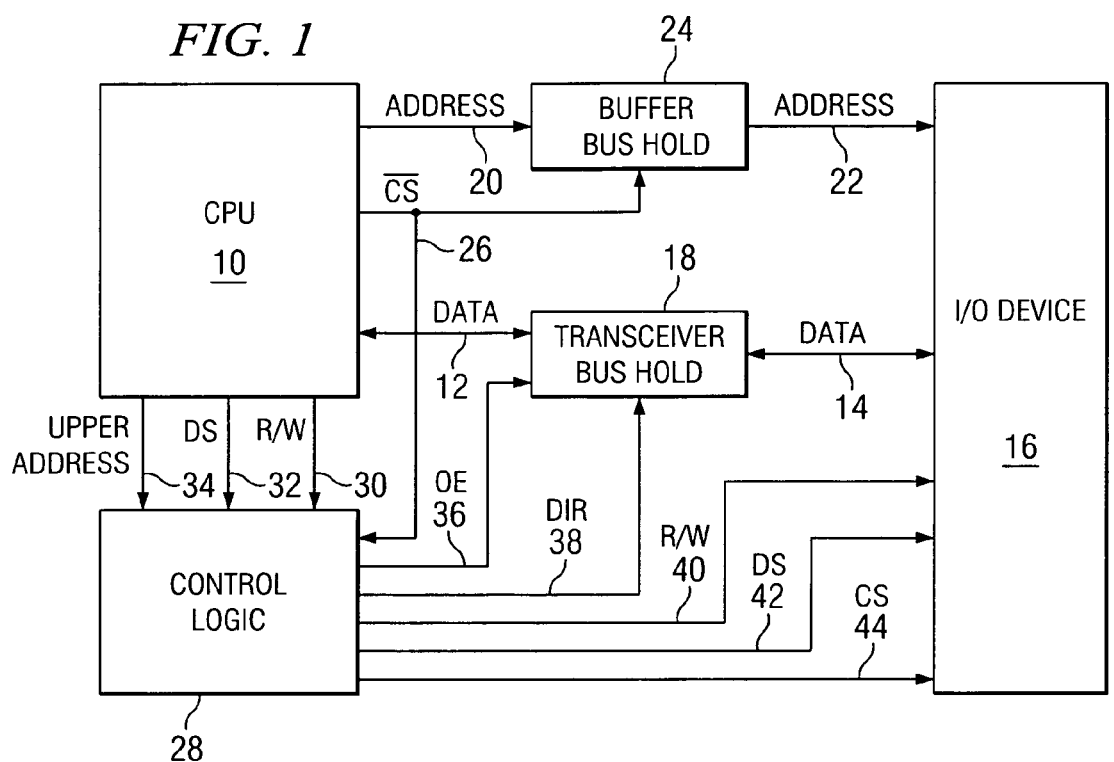
FIG. 1 is a block diagram illustrating the CPU to peripheral data bus arrangement according to the present invention; and, FIG. 2 is a timing diagram illustrating the signals which avoid contention on the data bus.

With reference now to FIG. 1 the arrangement of components according to the present invention will be described. A central processing unit, CPU, 10 is connected by a data bus 12, 14 to a peripheral device 16. Data bus 12, 14 is a bidirectional bus for transferring data in either direction between the data ports of CPU 10 and the data ports of peripheral device 16. In systems without the present invention, the data input/output connections of CPU 10 and peripheral 16 would be connected directly to the bus 12, 14 which would comprise only one set of conductors, one for each bit of data contained in a byte. Device 16 may be an input output, IO, device such as a modem. A transceiver 18 is positioned between sections 12 and 14 of the data bus. Transceiver 18 may be a SN74LVCH245 octal bus transceiver with 3-state outputs and bus hold on data inputs which is manufactured by Texas Instruments Incorporated or an equivalent device.

CPU 10 is also connected by an address bus 20, 22 to the address inputs of peripheral 16. The address bus 20,22 is a unidirectional bus for transferring address signals from the address outputs of CPU 10 to the address inputs of peripheral 16. In systems without the present invention, the address output connections of CPU 10 and the address input connections of peripheral 16 would be connected directly to the bus 20, 22 which would comprise only one set of conductors, one for each bit contained in an address. A buffer with bus hold 24 is connected between sections 20 and 22 of the address bus.

The CPU 10 provides a number of control signals to a control logic unit 28 and buffer 24. A chip select signal is provided on line 26 which is coupled to the output enable input of buffer 24 and to the logic unit 28. A read write signal is provided on line 30. A data strobe signal is provided on line 32. Upper bits of the address are provided on line 34. Lines 30, 32 and 34 are all connected to inputs of logic unit 28.

Logic unit 28 provides a number of outputs to control transceiver 18. An output enable signal is provided on line 36 and a direction signal is provided on line 38. Lines 36 and 38 are coupled to the output enable and direction inputs of transceiver 18. The output enable signal on line 36 is the data strobe signal from line 32 qualified by the upper address bits from line 34 and the chip select signal from line 26. The direction signal is the same as the read write signal from line 30.

Logic unit 28 also provides a number of outputs to control I/O device 16. It provides the read write signal on line 40, the data strobe signal on line 42 and the chip select signal on line 44. Lines 40, 42 and 44 are coupled to corresponding control inputs of I/O device 16.

Figure 2:
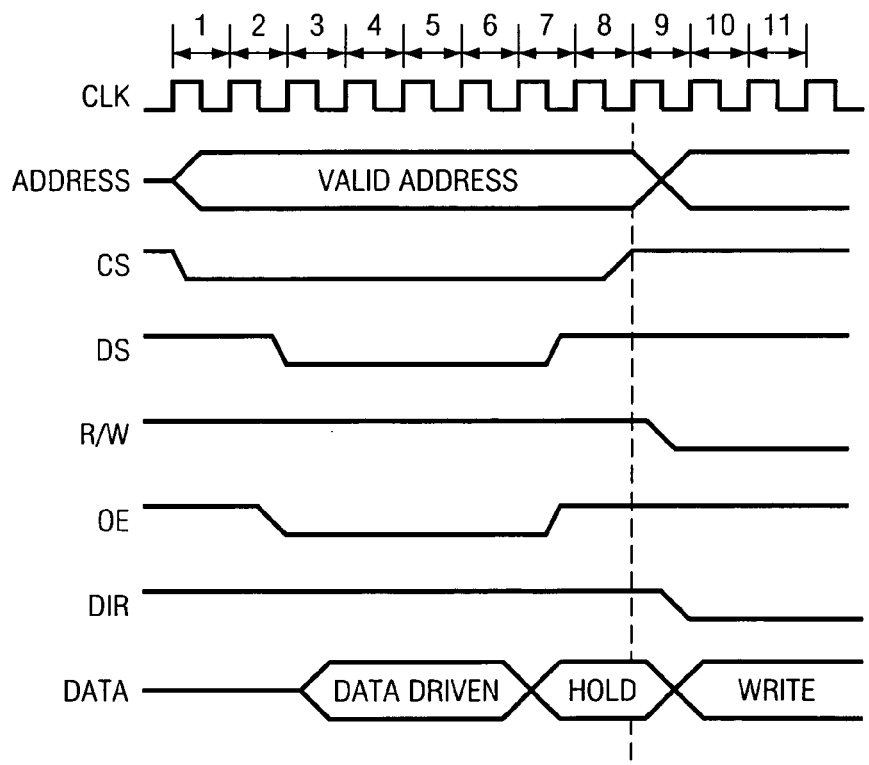

The timing of signals according to the present invention is shown in FIG. 2. The first signal, labeled CLK, is the system clock. Eleven cycles are illustrated and numbered. During the first eight clock cycles the CPU is calling for a read operation. A write operation begins with clock cycle nine.

The second illustrated signal labeled ADDR, is the address driven by CPU 10 onto bus 20, 22. In this illustration, a valid address for a memory location in peripheral 16 is present during the read operation. A valid address would also be present during the write cycle starting at clock cycle nine, but in this example it is the address of a memory location in a device other than peripheral 16.

The next signal, labeled CS, is the chip select signal which, in this embodiment, calls for peripheral 16 to either perform a read or write operation. The chip select signal is asserted when low. As illustrated it is low during the read operation, i.e. during clock cycles one through eight. It goes high at clock cycle 9, indicating that peripheral 16 is not the device selected to receive data during the write operation.

The next signal, labeled DS, is the data strobe signal. It is an asserted low signal. During the read cycle, it is asserted beginning in clock cycle two and ending in the middle of clock cycle seven, or one and one-half clock cycles before the end of the read operation.

The next signal, labeled R/W, is the read write command. This signal calls for a read operation when high and for a write operation when at logic low. As illustrated, it is high during the first eight clock cycles and goes low at the ninth clock cycle. It thereby calls for a read operation during clock cycles one through eight, followed by a write operation beginning on clock cycle nine.

The next signal, labeled OE, is the output enable signal provided by control logic 28 to the output enable input of transceiver 18.

The next signal, labeled DIR, is the direction signal provided by control logic 28 to the direction control input of transceiver 18.

The last signal, labeled DATA, indicates when data is being driven onto the data bus 12, 14. The read operation ends on the positive transition at the end of clock cycle number eight, at which time the CPU 10 reads the data on bus 12. It is therefore important that valid data be present at that time. However, it is possible for the CPU 10 to begin driving data onto bus 12 during clock cycle nine within 20 nanoseconds of the end of the read operation, as illustrated. In the present invention, contention is avoided by having the data outputs of device 16 go to the high impedance state, or tristate, during clock cycle seven. From that time until another device starts actively driving the data bus 12, the data provided by device 16 is held in valid state on bus 12 by the transceiver 18. This is indicated in FIG. 2 by the portion of the DATA signal marked "hold".

The signals described above provide the proper timing to avoid contention. As illustrated, the OE signal to transceiver 18 follows the DS signal from CPU 10. However, it is qualified by the CS signal and upper bits of the address signal to be sure that the transceiver is enabled only when the device 16 has actually been selected by the CPU 10 for a read or write operation. The address and CS signals are valid during the whole read operation from clock cycle one through eight. The data strobe signal goes active during clock cycle two and inactive during cycle seven. The OE signal follows the data strobe and causes the device 16 to stop driving data during clock cycle seven.

The bus hold circuitry in transceiver 18 provides a small positive feedback current to the device inputs. When peripheral 16 is driving data onto bus 14, the bus hold circuits on each of the bus inputs to transceiver 18 reinforce the signal provided by the peripheral and provide that signal on bus portion 12. When the peripheral outputs go three state, or high impedance, the small feedback current is sufficient to maintain the bus 12 at the logic level previously driven by the peripheral. However the feedback is weak relative to signals driven by active devices. As soon as CPU 10 begins driving the bus 12 with its data, the bus hold circuits will switch to follow the new signal levels. But up to that time the bus hold circuits hold the last written data so that at the end of clock cycle eight, valid data is present on the data bus 12 and the CPU 10 will read the correct data.

While the present invention has been illustrated and described in terms of particular apparatus and methods of operation, it is apparent that various modifications can be made within the scope of the invention as defined by the appended claims.

What we claim as our invention is:

1. A method for preventing contention on a data bus connecting a central processing unit and a peripheral device when the central processing unit calls for a read operation followed by a write operation, comprising:

connecting a transceiver with bus hold circuitry and an output enable input in the data bus between the central processing unit and the peripheral, generating a control signal which ends at a preselected time before the end of the read operation, and, providing the control signal to an input of the peripheral and to the output enable input of the transceiver.

2. The method of claim 1 further including;

connecting a buffer having an output enable input between an address output of said central processing unit and an address input of said peripheral device, and providing a chip select signal to the output enable input of said buffer.

3. The method of claim 1 wherein said preselected time is equal to or greater than the maximum time to enable high impedance state of said transceiver.

4. The method of claim 1 wherein said preselected time is greater than fifty nanoseconds.

5. Apparatus for preventing contention on a data bus connecting a central processing unit and a peripheral device when the central processing unit calls for a read operation followed by a write operation, comprising:

a transceiver with bus hold circuitry and an output enable input connected between the data bus input/output connections of the central processing unit and the peripheral, and control logic having an input for receiving a CPU chip select signal and an output for providing a peripheral control signal which ends at a preselected time before the end of the read operation, said control logic output connected to a control input of the peripheral and to the output enable input of the transceiver.

6. The apparatus of claim 5, further including;

a buffer connected between an address output of said central processing unit and an address input of said peripheral device, said buffer having an output enable input connected to the chip select signal.

7. The apparatus of claim 5 wherein said preselected time is equal to or greater than the maximum time to enable high impedance state of said transceiver.

8. The apparatus of claim 5 wherein said preselected time is greater than fifty nanoseconds.

9. A method for controlling the reading of data by a processing unit from a peripheral device over a bidirectional data bus during a read operation, said peripheral device having a maximum time to enable high impedance state, comprising;

connecting a transceiver with bus hold circuitry and an output enable input in the data bus between the central processing unit and the peripheral, generating a peripheral control signal which ends at a time equal to or greater than said maximum time to enable high impedance state before the end of the CPU read command, and, providing the peripheral control signal to an input of the peripheral and to the output enable input of the transceiver.

10. The method of claim 9, wherein said read operation occurs during eight clock cycles and said peripheral control signal ends one and one-half clock cycles before the end of the read operation.

11. Apparatus for controlling the reading of data by a processing unit from a peripheral device over a bidirectional data bus during a CPU read operation, said peripheral device having a control input and a maximum time to enable high impedance state, comprising;

a transceiver with bus hold circuitry connected between the data bus input/output connections of the central processing unit and the peripheral, said transceiver having an output enable input, control logic having an input for receiving a CPU data strobe signal and an output for providing a peripheral control signal which ends at a time equal to or greater than said maximum time to enable high impedance state before the end of the read operation, and, said control logic output connected to a control input of the peripheral and to the output enable input of the transceiver.

12. The apparatus of claim 11 wherein said read operation occurs during eight clock cycles and said peripheral control signal ends one and one-half clock cycles before the end of the read operation.

* * * * *